March 15, 1938.        M. S. GALLER        2,111,025
MOTH PREVENTION
Filed July 30, 1936
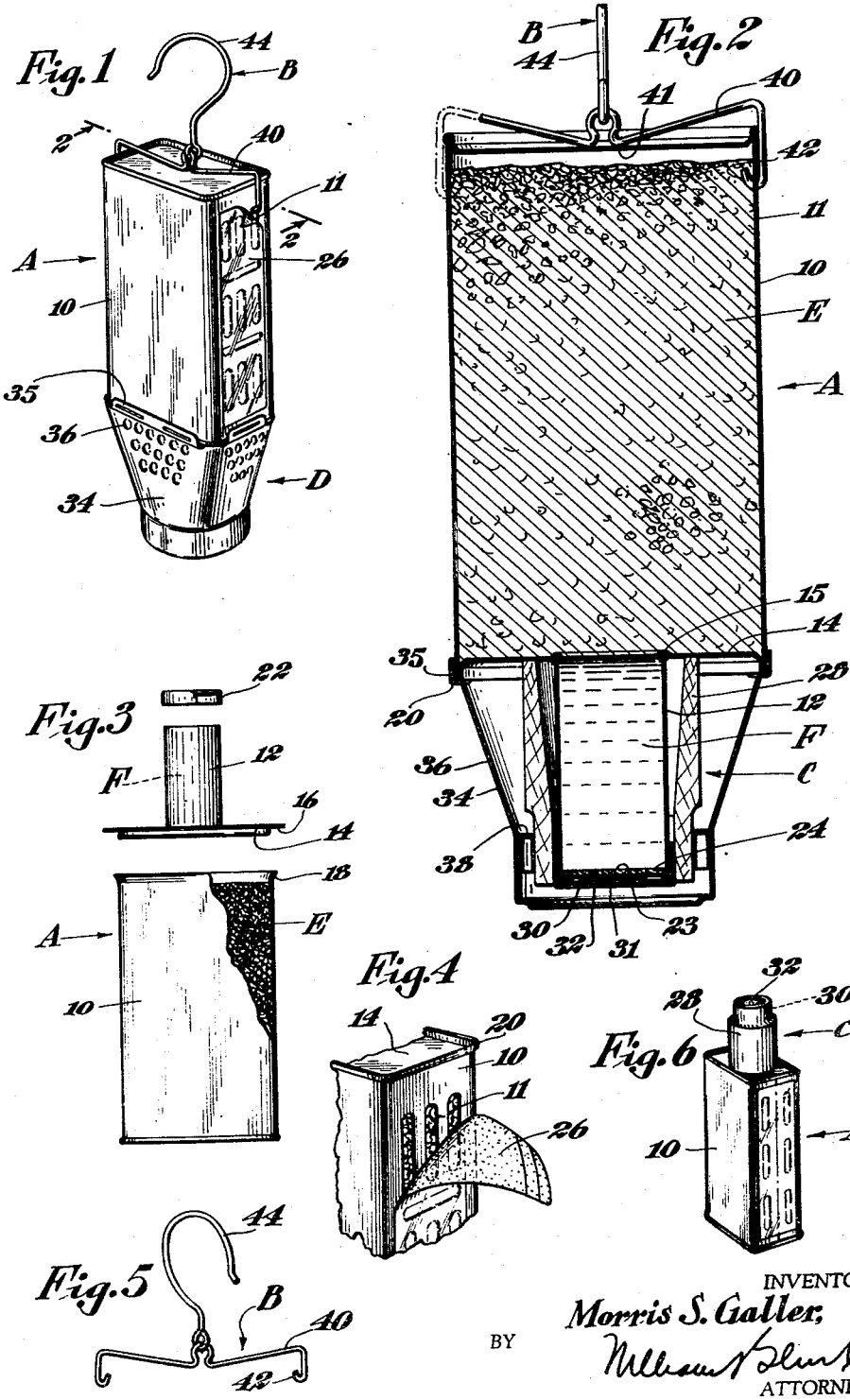
INVENTOR.
Morris S. Galler,
BY
ATTORNEY.

Patented Mar. 15, 1938

2,111,025

UNITED STATES PATENT OFFICE 2,111,025

MOTH PREVENTION

Morris S. Galler, New York, N. Y., assignor to Reefer Galler Inc., New York, N. Y., a corporation of New York Application July 30, 1936, Serial No. 93,364

11 Claims. (Cl. 299—24)

This invention relates in general to moth prevention, and in particular to means for generating moth preventive vapors, and coordinately therewith it relates to a method of manufacturing such means.

While my invention has been shown as embodied in means for generating moth-preventive vapors it will be understood that as to certain phases thereof it may have other applications.

Moth-preventive devices that depend for their action on vapors intended to kill or repel moths are frequently objectionable for the reasons that the active substances used therein, while effective in their action, have an unpleasant odor which will make their use undesirable. Other substances, while unobjectionable as to odor, are not as effective. I have discovered that by the simultaneous use of more than one substance under the proper conditions of use a more effective moth-preventive action is provided. For that purpose I select at least one of these substances that is highly efficient in action in that it kills moths and also preferably their eggs and larvae, although it has a strong odor, and I select at least one other substance, that, while not so effective as a moth preventive, has an odor that when combined with the odor of said first substance, gives a resultant odor that is not unpleasant, and may even be agreeable, and I further provide a unitary device for receiving these substances and for causing their simultaneous vaporization. By the simultaneous vaporization of the substances having the characteristics described, under suitable conditions, I obtain an effective moth-preventive action without any undesirable features.

Among the objects of my invention are therefore the provision of a unitary device for generating moth preventive vapors, that is effective and convenient in use; the provision in such a device of a plurality of individual compartments each intended to receive a substance adapted to give off moth preventive vapors; the provision in such a device of a unitary assembly that may be readily replaced by another such unitary assembly when the active substances contained therein are exhausted; and the provision in connection with the manufacture of such unitary assemblies of a novel method of assembling them and of charging them with moth preventive substances.

Among other objects may be mentioned the provision in a device for generating moth preventive vapors, of a unitary container having two compartments, and the walls of one serving as a closure for the other; the provision in such a device of a vaporizing cup or compartment adapted for ready attachment to and ready removal from the container just mentioned; the provision in connection with a container for a substance adapted to generate moth preventive vapors and having openings therein through which said vapors may escape, of a novel means for closing said openings so as to prevent the escape of such vapors prior to use; and the provision in a device for generating moth preventive vapors, of means for conveniently positioning the same so that it will be most effective in use.

For the attainment of these objects and such other objects as may hereinafter appear or be pointed out I have provided a receptacle of novel construction having two compartments therein provided with suitable openings for the escape of the substances therein contained or of the vapors thereof, and have provided in connection with such openings novel means for effectively closing them prior to use, and further a protective member adapted for removable attachment to said receptacle and to prevent contact of clothing with one of the moth preventive substances. I have also provided convenient and effective means for suspending said receptacle in a position best adapted for its use.

In order to make clear the principle of my invention I have disclosed one embodiment thereof in the drawing, in which:—

Figure 1 is a perspective view of my moth-preventive device in completely assembled form;

Figure 2 is a sectional view substantially on the line 2—2 of Figure 1 looking in the direction of the arrows, but showing the openings for permitting the escape of the moth-preventive vapor uncovered;

Figure 3 is an exploded view of the receptacle for receiving moth-preventive substances and indicating the manner of assembly of its parts;

Figure 4 is a detail view of the openings permitting the escape of moth preventive vapors, and the closure means provided for said openings;

Figure 5 is a detail view of the means for suspending my moth preventive device; and Figure 6 is a perspective view of a unitary assembly intended for sale as a unit for replacement purposes when the moth preventive substances have been used up.

Referring now to the drawing in detail, my device may be said to comprise the following main parts: (1) a receptacle adapted to receive the moth preventive substances, designated by A;

(2) hanger means, B, for suspending the receptacle A; (3) means, C, for effecting the vaporization of a portion of the contents of the receptacle; (4) a protective shield, D, detachably carried by the container A and adapted to surround the vaporizing means C and to prevent contact of clothing with said vaporizing means.

As will be subsequently described in detail, the receptacle or container A comprises two separate compartments, one of which is adapted to receive a solid substance E that will give off moth preventive vapors, and the other of which is adapted to receive a liquid substance F, also adapted to give off moth preventive vapors. I have found paradichlorbenzene to be a substance suitable for my purposes as fulfilling moth destructive requirements, and this being a solid will correspond to the substance E, while for the liquid substance F I have found cedar oil to be admirably suitable. Although cedar oil is not as effective for moth preventive purposes as might be desired, it possesses the valuable property of having a powerful, aromatic odor, considered pleasant by most people and adapted to modify the odor of the paradichlorbenzene.

The receptacle A is shown as comprising a main compartment 10 provided with openings 11 in the walls thereof through which the vapors proceeding from the substance E may escape into the surrounding air and secondly of a compartment 12 adapted to contain the substance F. By referring to Figures 2 and 3 it will be observed that the compartment 12 is of lesser cross-sectional area than the compartment 10, and is formed with a base portion 14 that extends beyond the sides thereof of such size that while it serves as a base for compartment 12 it is also adapted to serve as a cover for the compartment 10 and to be attached thereto by crimping the projecting flange 16, as shown in Figure 3, over the rim 18 of the wall of the compartment 10, so that the result is a bead 20 extending around the upper part of the compartment 10 and projecting outwardly therefrom, and which has a peculiar function as will hereinafter appear. The assembly of the base 14 of the compartment 12 to the body thereof may be effected in any suitable or preferred manner. By way of example I have shown a groove 15 formed in base 14 adapted to seat the wall portions of the compartment 12 and in which the latter may then be secured in any suitable or preferred manner, as by soldering. A cap 22 having an opening 23 therein for permitting the liquid to escape from the compartment 12, is adapted to seat over the open end thereof in liquid-tight engagement. I have found that such a liquid-tight union may be effected by providing a force fit between the cap 22 and the compartment, and this may be supplemented by other means well known in the art. In order to allow the escape of liquid from the container 12 for use, and to prevent its escape prior to use, I have shown a washer 24 of any suitable material positioned in the cap 22 so as to close the opening 23 therein. Any suitable or preferred material may be used for this purpose. By way of example I may mention pasteboard impregnated with paraffin.

Closure means is provided for preventing the escape of vapors from the compartment 10 prior to use. For this purpose I have shown a strip of material 26, or "tape", one surface of which is coated with an adhesive substance by which it may be caused to adhere to the walls of the container 10 in such a position that it closes the openings 11.

It will of course be understood that the material of which the receptacle A is made, as well as the tape and the adhesive used thereon should be of such character that they do not react chemically with the substances with which they come in contact to an extent that would interfere with their proper function.

By referring to Figures 2 and 6 it will be observed that the means C for causing the vaporization of the substances contained in the compartment 12 comprises a tube or collar 28 of material adapted to absorb the liquid F, such as wood, and this tube is shown as surrounding the container 12 and to be held thereon by the aid of a strip or strips 32 of absorbent material that are shown as wedged between the walls of the container 12 and the inner walls of the tube 28. A washer 30 of absorbent material such as felt is shown as interposed between the strips 32 and the container 12, and this washer is shown as provided with a central opening 31 adapted to register with the opening 23 in the cap 22. When the protective washer 24 is punctured the contents of the container will flow into the strips 32 and the washer 31 and will spread into the tube 28. It will further be observed that the tube 28 is shown as seating on the base portion 14, and thereby by the seating engagement of the lower end of the tube 28 on the compartment 12, as just described, it will be maintained in position in relation to the receptacle A.

In order to prevent contact of the vaporizer C, when hung in a clothes closet, with the garments therein, I have shown the same as surrounded by the protective arrangement D, already mentioned. This latter comprises a cup-shaped member 34 provided with resilient grooved extensions 35 adapted to fit over and to grip the bead 20 of the receptacle A, and these extensions 35 are of such stiffness that attachment and detachment may be readily effected without however impairing the security of the connection. The cup 34 is shown as having perforations 36 therein to permit the escape of vapors from the vaporizer C, and it also carries on the interior thereof a collar 38 of inverted U-shape cross section the purpose of which is to receive the collar 28 so as to center it within the cup and also to prevent the creeping upward along the inner walls of the cup 34 of the liquid from the compartment 12, that is apt to accumulate at the bottom of the cup 34.

The suspending means or hanger B are shown as comprising a bail member 40 provided with hooks 42 on the angularly disposed ends thereof, these hooks being of such size and so positioned that they may be inserted into two of the openings 11, and when so inserted the inner portions 41 of the bail will contact with the walls of the compartment 10. In order to insure effective action the bail may be made of resilient material, such as spring wire, and so contoured that when it is in place on the receptacle A the portions 41 will exert a pressure against the top wall of the compartment 10 that will serve to keep the bail in place.

It will further be observed from Figure 1 that the bail is placed in a biased or slightly diagonal position in relation to the end of the compartment 10. This arrangement is found convenient to provide for ready insertability of the bail 40 into the openings 11. Due to the increased length necessary for the bail if it is to be capable of attachment in the biased position, it may be easily passed over the bead 20 into a central medial unbiased position without much distortion and consequent resistance thereof. It may thereafter be biased into the position shown in Figure 1 and spring into the end openings 11 with very little further distortion.

A hook 44 is shown as pivotally carried by the bail 40, at a central looped portion thereof, for the purpose of hanging the device from a clothes rod or a hook.

In Figure 6 I have shown an assembly comprising the receptacle A and the tube 28, together with the strips 32 and the washer 30. These parts form an assembly that may be conveniently handled and sold as a unit for purposes of replacement when the active substances in the receptacle A become exhausted. For purposes of sale this assembly will also preferably include a hanger unit B, so that a purchaser of one of these replacement units may discard all parts of his old device except the protective cup D, which he may detach therefrom and attach to the new replacement unit.

It will be observed that my moth preventive device may be packaged in very compact form because of the disposition and configuration of its parts, and that, the hanger being detachable and foldable, will not interfere with this compactness because it may be placed in a comparatively small space in the package containing the device.

A purchaser of my device will first of all detach the protective cup D of the "cedarizer" (as I term the vaporizing device for the cedar oil F, where cedar oil is used), will puncture the strips 32 and the washer 24, where they register with the opening 23 of the cap 22, so as to permit of the escape of the contents of the compartment 12, and will then replace the cup D, remove the tape 26 so as to uncover the openings 11 and apply the hanger B. Thereafter the device may be hung from any convenient support, such as a clothes rod or a hook, and it is to be observed that it is preferably to be hung as high as possible since I have found that the moth preventive vapors where paradichlorbenzene and cedar oil are used, are heavier than air, and will tend to move downward. In order, therefore, to secure effective distribution of the vapors the device should preferably be hung in an elevated position.

While I have herein disclosed one embodiment of my invention and one manner of practising the same, it will be understood that it may be embodied in many other forms and practised in many other ways, and that I do not limit myself to the details of the disclosure herein, nor in any way other than as called for by the prior art.

Having thus described my invention and illustrated its use what I claim as new and desire to secure by Letters Patent is:

1. In a generator for moth-preventive vapors a compartment for a substance adapted to giv off moth-preventive vapors, said compartment having openings therein, whereby vapors from said substance may escape, hanger means for suspending said compartment, said hanger means having portions thereon adapted for insertion through the openings in said compartment, a second compartment for another substance adapted to give off moth-preventive vapors, said second compartment being joined to said first compartment so as to be supported thereby when said generator is in its normal position of use, and said second compartment having an opening therein adapted for the escape of said substance from said compartment, vaporizing means associated with said second compartment, said means comprising a cup carried by said first compartment, and porous means for absorbing said substance escaping from said second compartment, said last-named means being positioned within said cup.

2. In a generator for moth-preventive vapors, a compartment for a substance adapted to give off moth-preventive vapors, said compartment having openings therein, whereby vapors from said substance may escape, hanger means for suspending said compartment, said hanger means having portions thereon adapted for insertion through the openings in said compartment, a second compartment for another substance adapted to give off moth-preventive vapors, said second compartment being joined to said first compartment so as to be supported thereby when said generator is in its normal position of use, and said second compartment having an opening therein adapted for the escape of said substance from said compartment, vaporizing means associated with said second compartment, said means comprising a cup carried by said first compartment, and porous means for absorbing said substance escaping from said second compartment, said last-named means being positioned within said cup, and said cup having openings for permitting the escape of vapors from said vaporizing means, and said cup being readily detachable from said first compartment.

3. In a generator for moth-preventive vapors, an assembly comprising a compartment for a substance adapted to give off moth-preventive vapors, said compartment having openings therein through which vapors from said substance may escape, hanger means for suspending said compartment, said hanger means having portions adapted to pass through said openings in said compartment, a second compartment for the reception of a second substance adapted to give off moth-preventive vapors, said second compartment being supported by said first compartment when said generator is in its normal position of use, and said second compartment having an opening therein adapted for the escape of its contents therefrom, and vaporizing means associated with said second compartment, adapted for absorbing and causing the spreading and vaporization of said substance escaping from said opening in said second container.

4. In a generator for moth-preventive vapors, an assembly comprising a compartment for a substance adapted to give off moth-preventive vapors, said compartment having openings therein through which vapors from said substance may escape into the space surrounding the generator, a second compartment for the reception of a second substance adapted to give off moth-preventive vapors, said second compartment being supported by said first compartment on the outside thereof when said generator is in its normal position of use, and said second compartment having an opening in the bottom thereof adapted for the escape of its contents therefrom into the space surrounding said generator, and vaporizing means associated with said second compartment, adapted for absorbing and causing the spreading and vaporization of said substance escaping from said opening in said second container.

5. In a generator for moth-preventive vapors, an assembly comprising a compartment containing a solid substance adapted to give off moth-preventive vapors, said compartment having openings therein through which vapors from said substance may escape, a second compartment supported by said first compartment, exteriorly thereof when the generator is placed in its position of normal use, containing a liquid substance adapted to give off moth-preventive vapors, said second compartment having an opening in the bottom thereof adapted for the escape of its contents therefrom, and vaporizing means surrounding said second compartment, and including means for absorbing and causing the spreading and vaporization of said substance escaping from said opening in said second container.

6. In a device for generating moth-preventive vapors, a receptacle comprising two containers, one of said containers having an opening on one side thereof, and the other of said containers having a portion of the walls thereof adapted to seat over said opening so as to effect closure thereof, and said containers having interengaging portions for holding said first container in its closure effecting position in relation to the other of said containers, and a hollow member adapted to be positioned over one of said containers, said member having portions thereof adapted to removably engage said interengaging portions of said two compartments, so as to be supported in place over said container.

7. In a generator for moth-preventive vapors, a receptacle comprising two isolated containers, said containers having portions of the walls thereof crimped together so as to unite them, and a third container having resilient portions thereon in engagement with said crimped together portions, said resilient portions being adapted to yield on manipulation so as to permit disengagement of said third container from said receptacle.

8. In combination with an article to be suspended, said article having an upper wall and spaced side walls each having an opening therein, a bail having shoulder portions adapted to engage said upper wall, means on said bail for suspending the same, and resiliently mounted hooks forming the end portions of said bail and so positioned that when said shoulder portions are in engagement with said upper wall said hook portions may be sprung into said openings under resilient tension, whereby said shoulder portions will be pressed against said upper wall.

9. In combination with an article to be suspended, said article having an upper wall and spaced side walls each having an opening therein, a bail having shoulder portions adapted to engage said upper wall, means on said bail for suspending the same, said means being positioned intermediate said shoulder portions and resiliently mounted hooks forming the end portions of said bail and so positioned that when said shoulder portions are in engagement with said upper wall said hook portions may be sprung into said openings under resilient tension, whereby said shoulder portions will be pressed against said upper wall.

10. In a generator for moth-preventive vapors, a compartment for a substance adapted to give off moth-preventive vapors, said compartment having openings therein, whereby vapors from said substance may escape, a second compartment for another substance adapted to give off moth-preventive vapors, said second compartment being joined to said first compartment, so as to be supported thereby when said generator is in its normal position of use, and said second compartment having an opening therein adapted for the escape of said substance from said compartment, vaporizing means associated with said second compartment, said means comprising a cup carried by said first compartment, and porous means for absorbing said substance escaping from said second compartment, said last-named means being positioned within said cup.

11. In a generator for moth-preventive vapors, an upper compartment having vent means, in an outer wall thereof, said compartment containing a substance adapted to give off moth-proof vapors, a lower compartment supported from said upper compartment and having vent means in an outer wall thereof when the generator is in its normal position of use, and containing a different substance also adapted to give off moth-preventive vapors, and supporting means removably attached to said upper compartment, and said two substances being of such character that their vapors move downward by gravity so that they will mingle into a composite vapor.

MORRIS S. GALLER.